United States Patent [19]

Brady et al.

[11] Patent Number: 6,102,238

[45] Date of Patent: Aug. 15, 2000

[54] SLOW COOKER WITH LID CLAMP

[75] Inventors: Martin Brady, Chesterfield; David L. Jackson, Mechanicsville, both of Va.

[73] Assignee: Hamilton Beach/Proctor-Silex, Inc., Glen Allen, Va.

[21] Appl. No.: 09/226,927

[22] Filed: Jan. 8, 1999

Related U.S. Application Data

[60] Provisional application No. 60/071,096, Jan. 9, 1998.

[51] Int. Cl.⁷ .................................................. B65D 45/02
[52] U.S. Cl. ........................ 220/315; 220/322; 220/756; 220/912; 126/373; 292/288
[58] Field of Search ................................ 220/912, 573.1, 220/315, 322, 287, 754, 756, 760; 215/319, 273, 286, 287, 290, 291, 293; 206/805; 99/324, 325, 339, 345; 126/373; 292/246, 288, DIG. 11; 24/300; D7/360, 387, 394

[56] References Cited

U.S. PATENT DOCUMENTS

| | | |
|---|---|---|
| Re. 3,080 | 8/1868 | Squire .................................. 215/290 X |
| Re. 17,398 | 8/1929 | Kircher . |
| 148,130 | 3/1874 | Moore . |
| 192,453 | 6/1877 | Purdy ...................................... 215/290 |
| 223,013 | 12/1879 | Shirley et al. . |
| 323,101 | 7/1885 | Bard ................................... 215/290 X |
| D. 388,657 | 1/1998 | Bacharowski . |
| 398,539 | 2/1889 | Rock . |
| 466,648 | 1/1892 | Young . |
| 862,908 | 8/1907 | Hawkinson . |
| 899,084 | 9/1908 | Thoits et al. . |
| 951,916 | 3/1910 | Leighty . |
| 961,963 | 6/1910 | Hughes . |
| 1,065,667 | 6/1913 | Donnell . |
| 1,084,817 | 1/1914 | Parkinson . |
| 1,204,715 | 11/1916 | Taylor ..................................... 215/290 |
| 1,207,974 | 12/1916 | Miller . |
| 1,232,385 | 7/1917 | Palmer . |
| 1,271,230 | 7/1918 | Sabo . |
| 1,300,712 | 4/1919 | Ferdon . |
| 1,336,491 | 4/1920 | Stern . |
| 1,367,739 | 2/1921 | Hibbard . |
| 1,410,515 | 3/1922 | Saddlemire ........................ 215/290 X |
| 1,438,706 | 12/1922 | Hegenberg . |
| 1,451,545 | 4/1923 | Ingersoll . |
| 1,483,255 | 2/1924 | Tonge . |
| 1,513,581 | 10/1924 | Caumont . |
| 1,531,772 | 3/1925 | Wentorf et al. . |
| 1,765,135 | 6/1930 | Doland . |
| 1,802,557 | 4/1931 | Hight . |
| 2,526,050 | 10/1950 | Schweiso et al. . |
| 2,636,639 | 4/1953 | Frey . |
| 2,817,552 | 12/1957 | Bruel . |
| 2,846,257 | 8/1958 | Sherrill . |
| 2,974,990 | 3/1961 | Mereness . |
| 3,124,381 | 3/1964 | Geldart . |
| 3,133,665 | 5/1964 | Colhouer . |
| 3,140,795 | 7/1964 | Griffith et al. . |
| 3,174,787 | 3/1965 | Kolman . |
| 3,291,515 | 12/1966 | Lierman . |
| 3,363,924 | 1/1968 | Remig . |
| 3,589,760 | 6/1971 | Williams . |
| 3,674,298 | 7/1972 | Vekony . |
| 3,746,205 | 7/1973 | Helguera . |
| 4,095,830 | 6/1978 | Spellman . |
| 4,241,846 | 12/1980 | Murphy . |
| 4,545,501 | 10/1985 | DeFord . |
| 5,687,879 | 11/1997 | King et al. . |

FOREIGN PATENT DOCUMENTS

| | | | |
|---|---|---|---|
| 318534 | 6/1934 | Italy ....................................... 215/278 |
| 318829 | 6/1934 | Italy ....................................... 215/290 |
| 10948 | of 1884 | United Kingdom .................... 215/278 |
| 27061 | of 1896 | United Kingdom .................... 215/291 |
| 22445 | of 1914 | United Kingdom .................... 215/290 |

*Primary Examiner*—Nathan J. Newhouse
*Attorney, Agent, or Firm*—Roger S. Dybvig

[57] ABSTRACT

A slow cooker is provided with a clamp assembly for holding the parts of the cooker together when transporting the cooker from one location to another. The clamp assembly includes downwardly-opening grooved portions of housing handles and an elastomeric band having opposite end portions received within the grooved portions of housing handles.

4 Claims, 6 Drawing Sheets

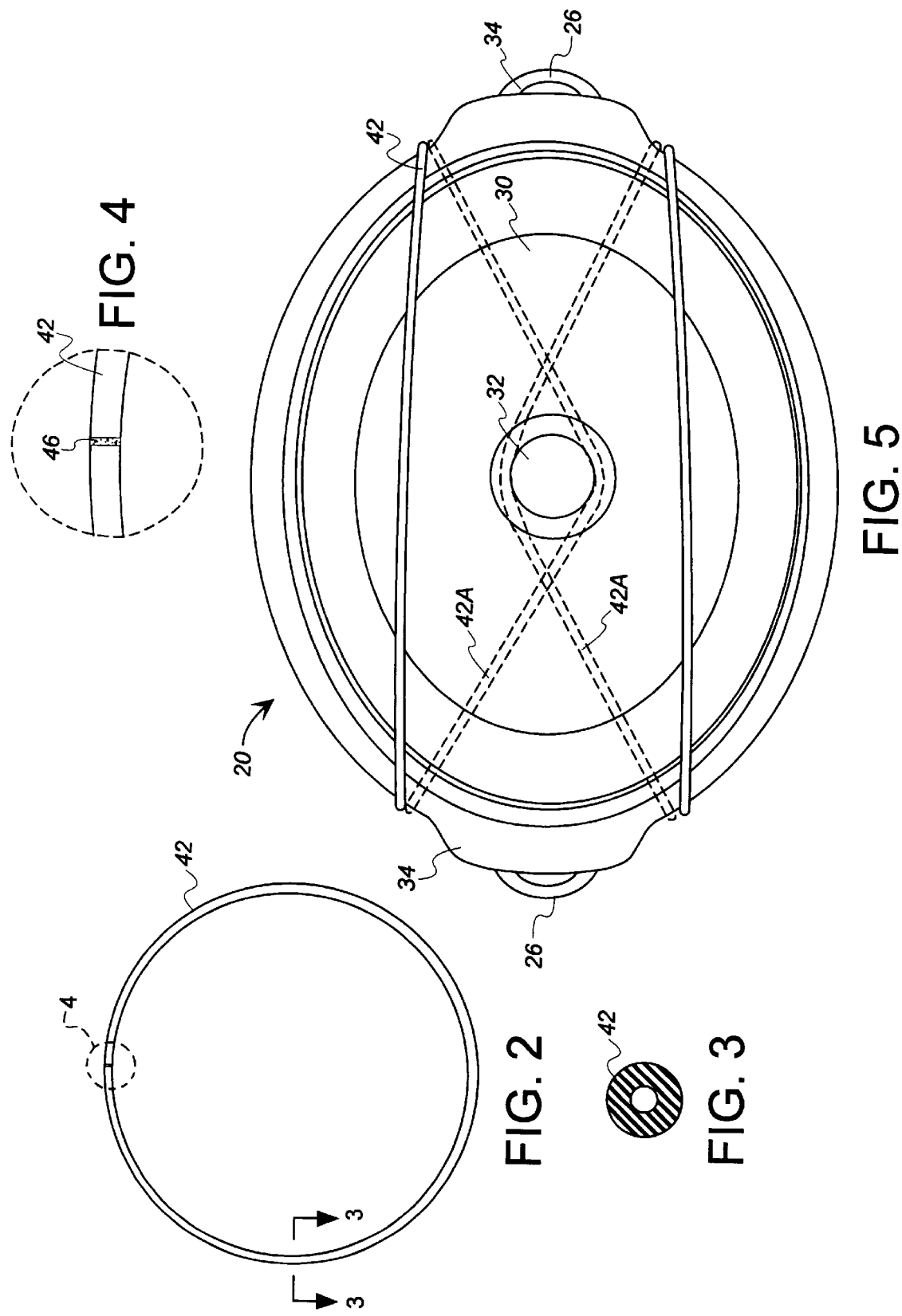

SLOW COOKER WITH LID CLAMP

CROSS-REFERENCE TO RELATED APPLICATION

This application claims the benefit of U.S. Provisional application Ser. No. 60/071,096, filed Jan. 9, 1998.

FIELD OF THE INVENTION

This invention relates to slow cookers, which are also known as "crock pots," for household use.

BACKGROUND OF THE INVENTION

A popular type of slow cooker comprises either a plastic or a ceramic bowl received in a housing, which is commonly made from metal. A lid, usually made from a transparent glass, is removably mounted on the bowl, and has an upwardly protruding knob which can be grasped to lift the lid. The housing has electrically-operated controls and heating means for heating foods placed in the bowl. The housing has handles so that it can conveniently be moved back and forth from a storage shelf and a kitchen counter. Often, a cook may want to move the slow cooker after it is loaded with the food to be cooked from, say, a kitchen counter to a serving table.

The bowls and the lids of slow cookers are not usually made to close tolerances, and the lids are typically not securely engaged with the bowls. This creates a potential for the lid to slide off the bowl when the slow cooker is being carried from one location to another. Also, foods cooked in a slow cooker usually have a significant liquid content which can be spilled if the bowl is tilted while the slow cooker is moved.

SUMMARY OF THE INVENTION

An object of this invention is to provide a slow cooker having a clamp assembly for holding the parts of the cooker together for use when transporting the cooker from one location to another. A related object of this invention is to provide such a clamp assembly which is inexpensive, reliable and easy to use.

In accordance with this invention, a slow cooker is provided with a clamp assembly including housing handles having downwardly-opening notched or grooved portions and an elastomeric band in the form of an O-ring removably received within the grooved portions. In use, the elastomeric band is stretched over the top of the slow cooker lid with opposite ends thereof received in the grooved portions of both housing handles and held therein by the inherent resiliency of the elastomeric band.

In order to obviate the need for the user to touch any hot surfaces when applying the elastomeric band to the slow cooker, the elastomeric band is sufficiently strong and resilient that one can insert the band into the notched or grooved portions of one of the housing handles and, by pulling the opposite side of the band upwardly and toward the other handle, stretch the band past the other handle and release the band into the notched or grooved portions thereof.

Other objects and advantages will become apparent from the following description and the drawings.

BRIEF DESCRIPTION OF THE DRAWINGS

FIG. 2 is a plan view of an elastomeric band used to clamp the parts of the slow cooker together.

FIG. 3 is a cross-sectional view of the elastomeric band taken along section line 3—3 of FIG. 2, and represented in larger scale than FIG. 2.

FIG. 4 is an enlarged plan view of a portion of the elastomeric band shown within the circle "4" of FIG. 2.

FIG. 5 is a plan view of the slow cooker of FIG. 1 with the elastomeric band shown clamping the parts of the slow cooker together.

DETAILED DESCRIPTION

Figure 1:
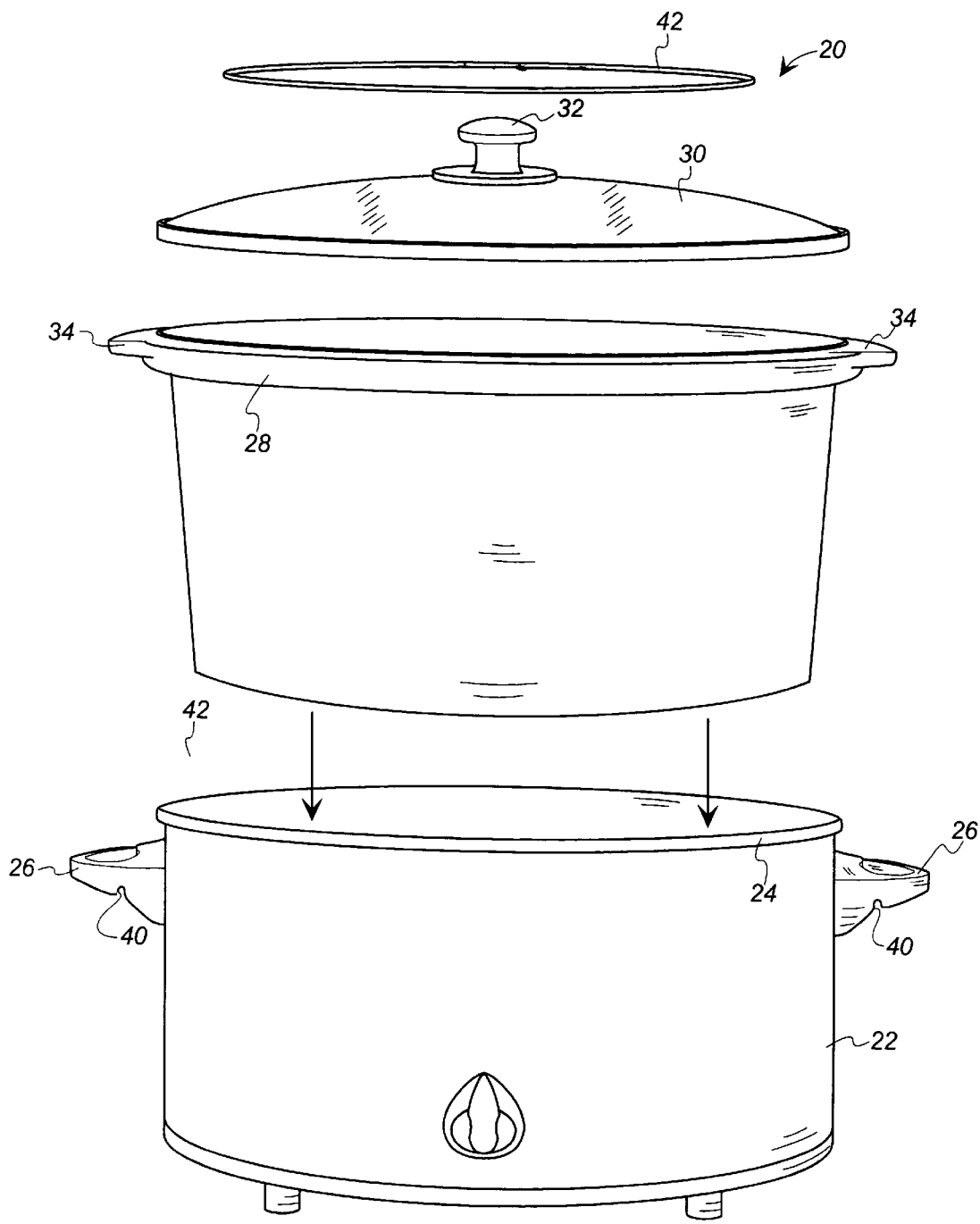
FIG. 1 is an exploded, perspective view of a slow cooker with lid clamp in accordance with this invention.

With reference to the drawings, a slow cooker is generally designated 20 and includes a housing 22 for electrical controls and electric heating elements (not shown). The housing 22 has an upper rim 24 and a diametrically opposed pair of handles 26. A plastic or ceramic bowl 28 is removably nested in the housing 22 and is provided with a removable lid 30 having a central, upwardly protruding knob 32. The outer margin of the bowl 28 is generally oval but could be circular or some other shape, and has integrally-formed, diametrically opposed hand grip portions or handles 34, which can be grasped when handling the bowl 28, such as when removing the bowl from the housing 22.

The housing handles 26 may be connected to the housing 22 in any suitable fashion. Preferably, mounting screws (not shown) accessible from inside the housing 22 extend through the wall of the housing 22 into tapped holes (not shown) in the housing handles 26. As thus far described, the slow cooker 20 may be entirely conventional and details thereof may be changed in accordance with the preferences of the manufacturer.

In accordance with this invention, the slow cooker 20 is provided with a clamp assembly for holding the lid 30 securely to the bowl 28 and also serving to hold the bowl 28 securely within the housing 22. For these purposes, the housing handles 26 have downwardly-opening notched or grooved portions 40 spaced from the wall of the housing 12 and an elastomeric band, loop or o-ring, designated 42, is held in the grooved portions 40 by its inherent resiliency.

Figure 9:
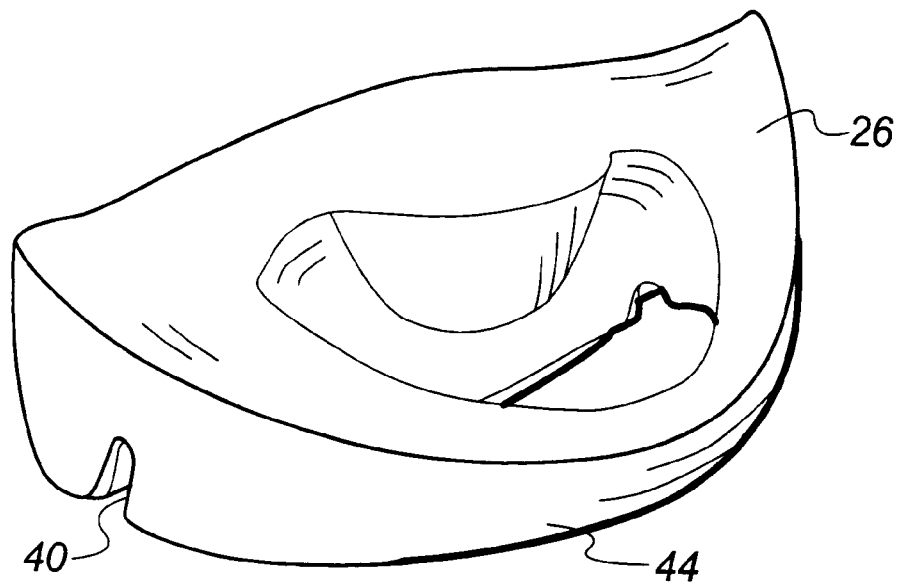
FIG. 9 is an isometric view of a housing handle in accordance with this invention, as viewed generally from above and to one side of the handle.
Figure 10:
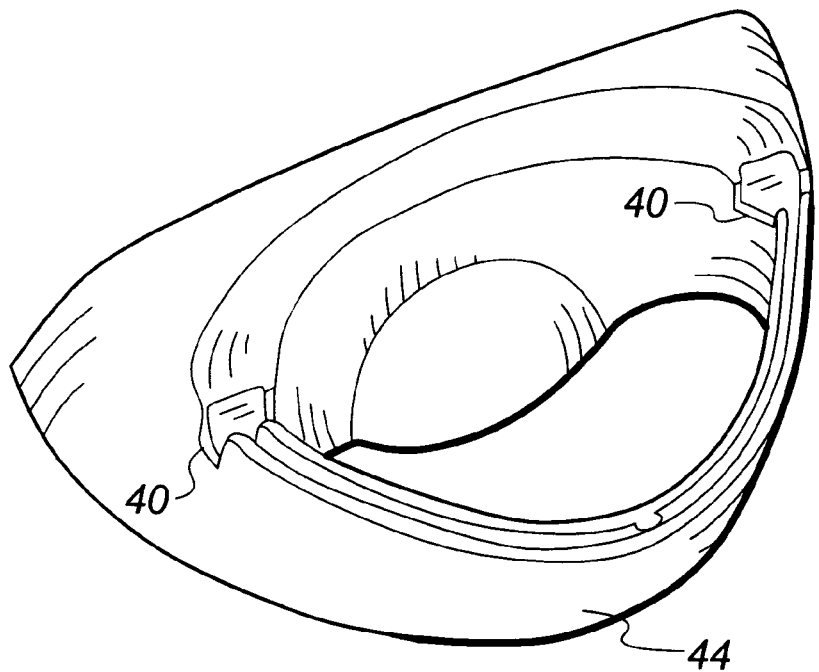
FIG. 10 is an isometric view of the housing handle of FIG. 9, as viewed generally from below and to the same side of the handle.

FIGS. 9 and 10 show one of the housing handles 26 in a larger scale. The particular housing handle 26 is of the open loop type, the handle loop being formed in part by an arcuate section 44 which has a grooved portion 40 at each end thereof. As will be readily recognized, the particular design or style of housing handle used in the practice of this invention is unimportant provided that the housing handle has grooved portions that open at least somewhat downwardly in order to enable the elastomeric band 42 to be retained therein due to its inherent resiliency.

With reference to FIGS. 2, 3 and 4, the presently-preferred elastomeric band 42 comprises an elongate strand of thick-walled silicone rubber tubing having its opposite ends connected to one another by a suitable adhesive 46. The elastomeric band 42 preferably can withstand continuous temperatures or 150° C., be sufficiently resilient to return to its original, unstretched dimensions and shape after being stretched to 150% of its original, unstretched length. Its load at 150% stretch should not exceed 10 pounds and at 50% stretch should be approximately four or five pounds. The elastomeric band 42 and the adhesive 42 must be made from acceptable food grade materials to satisfy requirements of the Federal Food and Drug Administration. The material forming the band 42, including the adhesive 44, should also be resistant to water, oils, soaps, or detergents, should have excellent aging properties, and should not have inherent tastes or odors. A food grade silicone rubber material having a durometer of 40 shore A, a nominal outer diameter of 0.187 inch and a nominal internal diameter of 0.066 inch is acceptable for a band having a nominal outside diameter of 9.2 inches. Such a band can be formed from a strand of silicone rubber 29 inches long and bonded to an endless configuration by a suitable high strength adhesive that provides an average joint strength of 14 pounds.

FIG. 5 shows the elastomeric band 42 straddling the bowl handles 34 and having its intermediate portion stretched over the top of the housing 22, the bowl 28 and the bowl lid 30 to securely hold all of the parts of the slow cooker 20 together. The intermediate portion of the band 42 forms two strands on opposite sides of the lid knob 32. As an option, illustrated by phantom lines 42A, the two strands of the elastomeric band 42 can each be extended around the respective opposite sides of the lid knob 32 whereby the strands cross over one another at two locations as illustrated. This places the elastomeric band 42 under greater tension and may apply a greater clamping force to the parts of the slow cooker 20.

Figure 6:
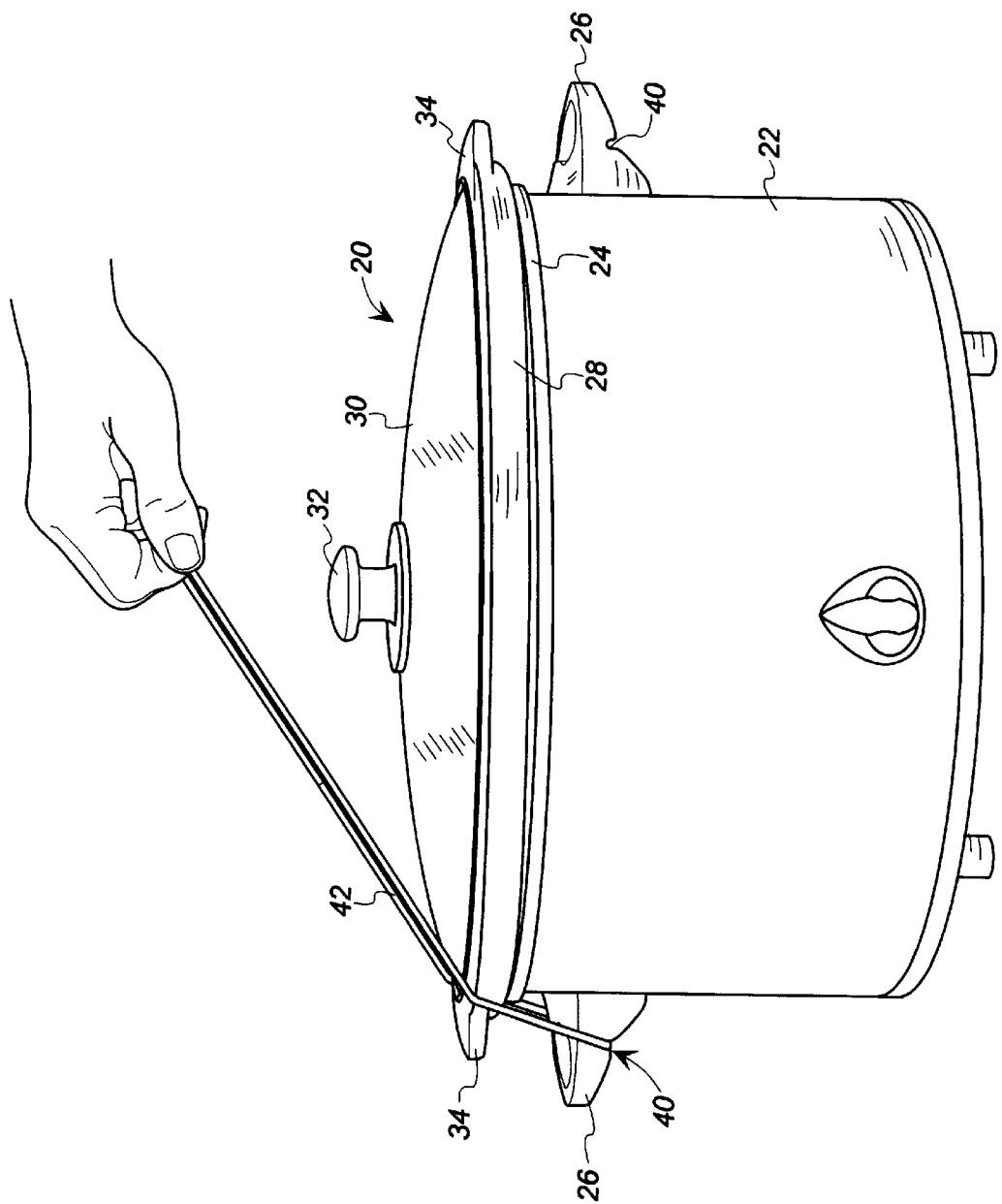
FIGS. 6, 7 and 8 illustrate in succession steps taken to assemble the elastomeric band onto the slow cooker.
Figure 7:
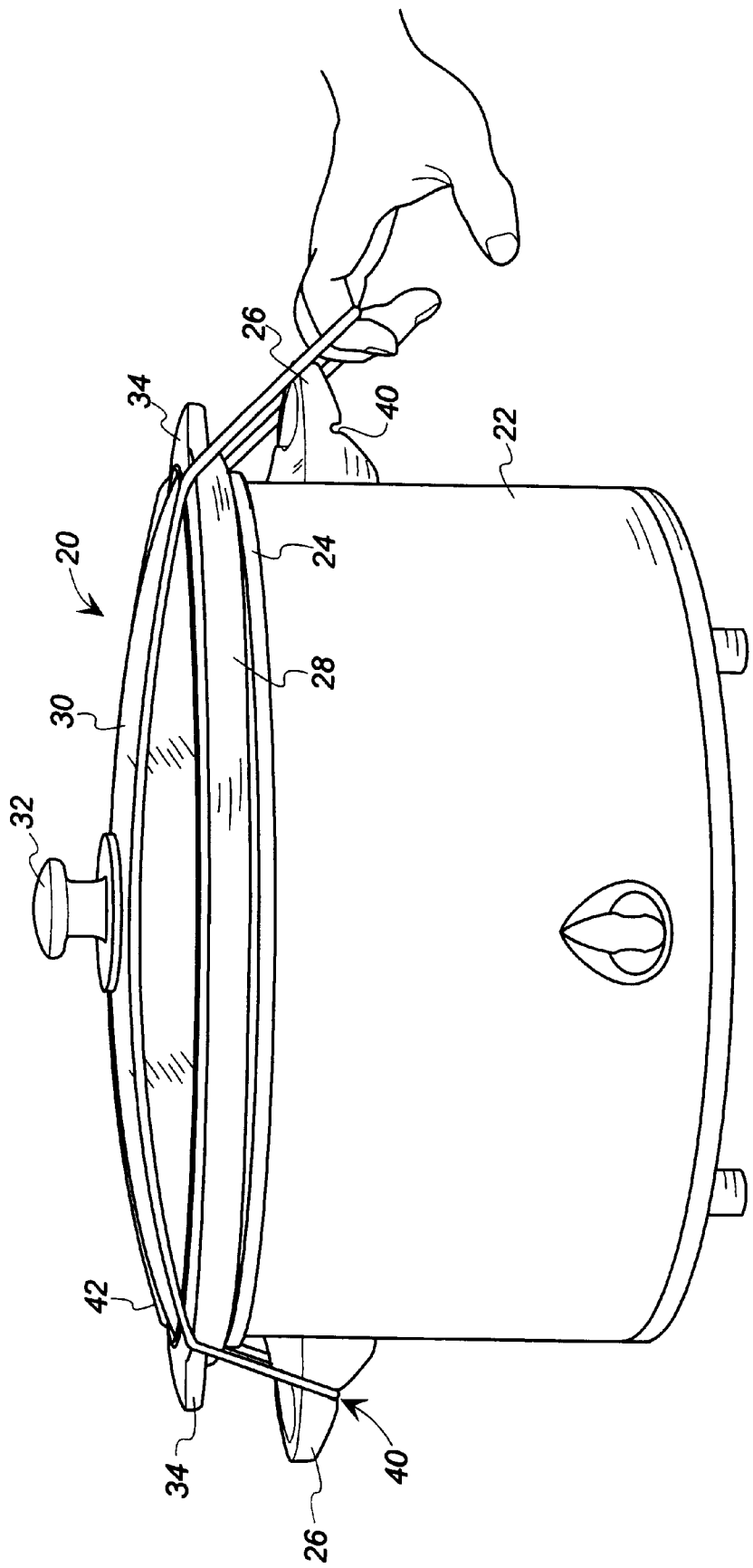
Figure 8:
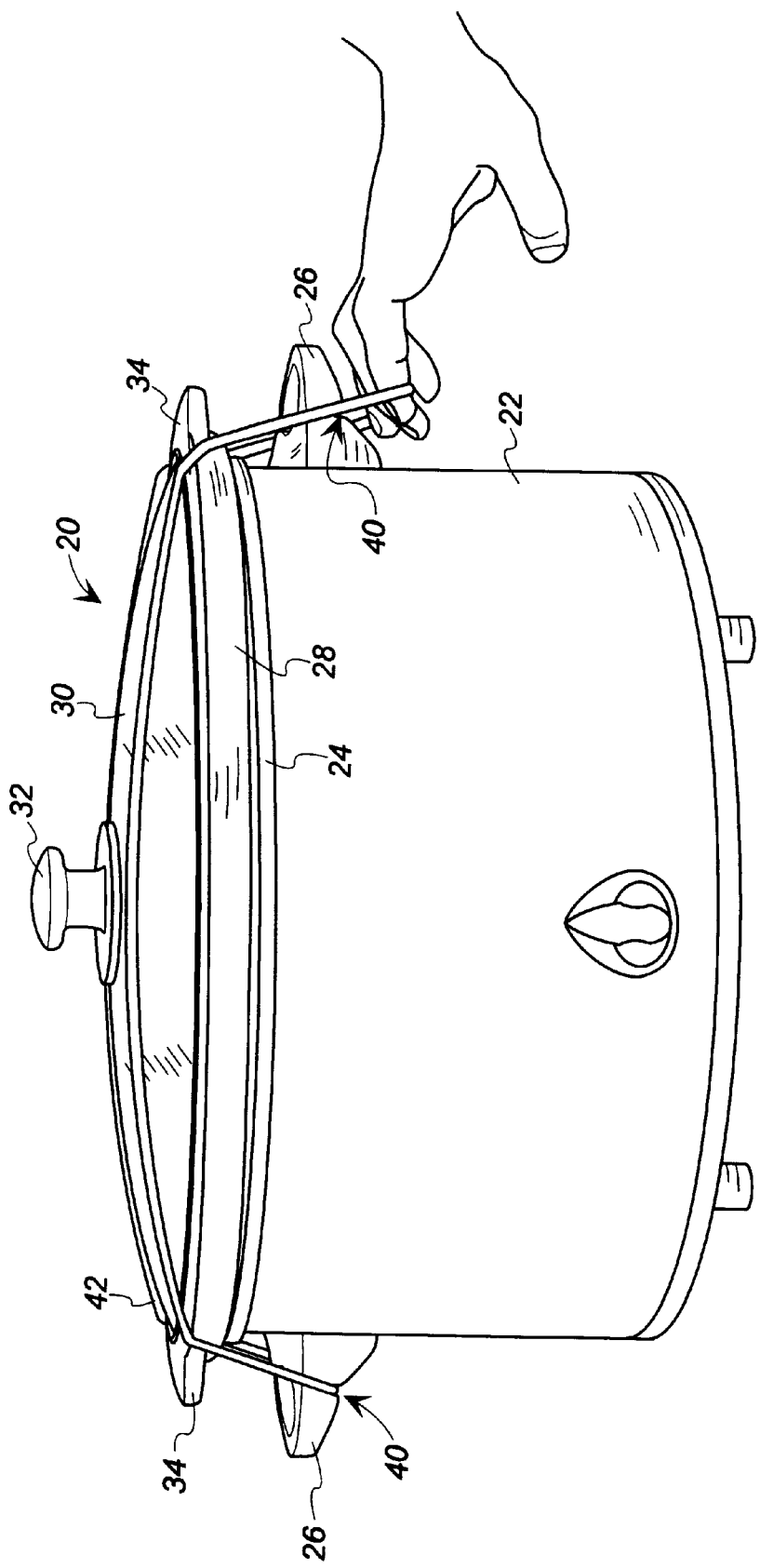

To assemble the elastomeric band 42 onto the slow cooker 20, part of the band 42 is inserted into the grooved portions of one of the handles 26, as shown in FIG. 6, and the diametrically opposite portion of the band 42 pulled upwardly over the slow cooker 20 and toward the opposite side of the cooker 20. The band 42 is then stretched past the handle 26 at the opposite side of the cooker 20, as shown in FIG. 7, and under the latter handle 26 in alignment with the grooved portions 40 thereof, as shown in FIG. 8, so that it can enter such grooved portions 40. Because the band 42 is capable of being stretched to the extent indicated in FIGS. 6, 7 and 8, the assembly of the band 42 onto the cooker 20 can be accomplished without touching any parts of the cooker 20.

Although the presently preferred embodiment of this invention has been described, it will be understood that within the purview of the invention various changes may be made within the scope of the following claims.

We claim:

1. A slow cooker comprising a housing having a pair oppositely directed handles, each having a downwardly opening grooved portion; a bowl received within the housing; a bowl lid covering the bowl; and an elastomeric band having opposite end portions received within said grooved portions and an intermediate portion stretched over the top of said housing, said lid, and said bowl.

2. The slow cooker of claim 1 wherein said elastomeric band comprises a food grade silicone rubber.

3. The slow cooker of claim 1 wherein said bowl is removably received by said housing.

4. The slow cooker of claim 3 wherein said bowl has a pair of oppositely directed handles overlying said housing handles when said bowl is supported by said housing.

* * * * *